United States Patent
Zhang et al.

(10) Patent No.: US 9,501,843 B2
(45) Date of Patent: Nov. 22, 2016

(54) FAST FACE BEAUTIFYING METHOD FOR DIGITAL IMAGES

(71) Applicant: Xiamen Meitu Technology Co., Ltd., Xiamen, Fujian (CN)

(72) Inventors: Wei Zhang, Fujian (CN); Songlin Fu, Fujian (CN); Changding Zhang, Fujian (CN)

(73) Assignee: XIAMEN MEITU TECHNOLOGY CO., LTD., Xiamen, Fujian (CN)

( * ) Notice: Subject to any disclaimer, the term of this patent is extended or adjusted under 35 U.S.C. 154(b) by 152 days.

(21) Appl. No.: 14/574,815

(22) Filed: Dec. 18, 2014

(65) Prior Publication Data

US 2016/0086355 A1   Mar. 24, 2016

(30) Foreign Application Priority Data

Sep. 22, 2014   (CN) .......................... 2014 1 0488602

(51) Int. Cl.
| | |
|---|---|
| G06K 9/40 | (2006.01) |
| G06T 11/00 | (2006.01) |
| H04N 9/04 | (2006.01) |
| H04N 9/64 | (2006.01) |
| H04N 9/69 | (2006.01) |
| G06T 5/00 | (2006.01) |
| G06K 9/00 | (2006.01) |
| G06T 5/50 | (2006.01) |

(52) U.S. Cl.
CPC ......... *G06T 11/001* (2013.01); *G06K 9/00234* (2013.01); *G06T 5/002* (2013.01); *G06T 5/50* (2013.01); *H04N 9/045* (2013.01); *H04N 9/64* (2013.01); *H04N 9/646* (2013.01); *H04N 9/69* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,343,141 | B1 * | 1/2002 | Okada | G06K 9/00268 348/587 |
| 6,993,167 | B1 * | 1/2006 | Skladnev | A61B 5/444 382/128 |
| 7,218,759 | B1 * | 5/2007 | Ho | G06K 9/00234 348/135 |
| 7,844,076 | B2 * | 11/2010 | Corcoran | G06K 9/00228 348/152 |
| 8,406,482 | B1 * | 3/2013 | Chien | G06K 9/4652 382/115 |

(Continued)

*Primary Examiner* — Andrae S Allison
(74) *Attorney, Agent, or Firm* — Jackson IPG PLLC; Demian K. Jackson

(57) ABSTRACT

The present invention provides a fast face beautifying method for digital images. Gaussian blur is performed to an original image to extract a green channel value which is then subject to linear light blending and hard light blending, and a blended green channel value is recalculated. Meanwhile, skin recognition and whitening are performed to the original image, and finally, by using a product of the recalculated green channel value by a probability obtained by skin recognition as a transparency, transparency blending is performed to the original image and the whitened image to compose a beautified image. Moreover, by performing skin recognition to the original image, black pixels will be prevented from being processing by an algorithm, so that hairs, eyes and other non skin parts will be prevented from being processing. Consequently, the final effect of beautification will become better and more natural.

14 Claims, 1 Drawing Sheet

FIG.1

(56) References Cited

U.S. PATENT DOCUMENTS

| | | | | |
|---|---|---|---|---|
| 8,494,263 B2* | 7/2013 | Dempski | ............ | G06K 9/00369 345/581 |
| 8,705,811 B1* | 4/2014 | Brunner | ............ | H04N 5/20 348/169 |
| 2007/0110305 A1* | 5/2007 | Corcoran | ............ | G06K 9/00228 382/167 |
| 2007/0274573 A1* | 11/2007 | Hori | ............ | G06K 9/00234 382/118 |
| 2010/0322300 A1* | 12/2010 | Li | ............ | G06K 9/00234 375/240.01 |
| 2012/0223955 A1* | 9/2012 | Dempski | ............ | G06K 9/00369 345/582 |
| 2013/0113956 A1* | 5/2013 | Anderson | ............ | G06F 3/017 348/223.1 |

\* cited by examiner

FAST FACE BEAUTIFYING METHOD FOR DIGITAL IMAGES

FIELD OF THE INVENTION

The present invention relates to an image processing method which is used for fast face beautification.

BACKGROUND OF THE INVENTION

With the progress of technology, there are more and more equipments using high-definition or miniature cameras or image acquisition devices, for example, digital cameras, mobile phones, tablet computers and even laptop computers, etc. The pixel and aperture of camera equipment, the light and stability of a shooting situation or even the I/O performance of the equipment will influence the quality of images. As a result, there is a difference between the digital image and the actual picture in the real world. Such difference may do things against users' assumptions and may not meet the aesthetic demands of the users. Therefore, various image post-processing softwares have come out. By being processed in terms of color, an image is allowed to visually satisfy the aesthetic standards of a user than the original image.

However, due to inappropriate intelligent detection of images, incorrect processing methods or complicated processing processes, many post-processing softwares are time-consuming and failed to meet the users' requirements, even make the processed images worse.

In conclusion, some of the present technologies for face beautification are far behind the users' requirements. Thus, it is very necessary to develop an efficient and effective method for fast face beautification.

SUMMARY OF THE INVENTION

To solve the above problems, the present invention provides a fast face beautifying method for digital images, which has high efficiency and out-standing performance so that the mages are more aligned with the aesthetic demands of users; moreover, skin recognition can find out black pixels which will be prevented from being processing by the beautification algorithm so that hairs, eyes and other non skin parts can be preserving. Consequently, the final effect of beautification will become better and more natural.

To achieve the goals of the fast face beautifying method for digital images, the present invention employs the following technical solutions:

A fast face beautifying method for digital images is presented, comprising the following steps of:

step 1. reading an original image locally or remotely;

step 2. the original green channel image is convolved with Gaussians to produce the Blurred image. we set the count variable i and j to zero. the constant variable h refer to the image height and w refer to the image width.

step 3. The green channel value G of each pixel in the original image is linear combined to the green channel value in the blurred image got by step 2 and result in a combined value G1.

step 4. The combined green channel value G1 of each pixel in the combined image we got by step 3 is hard-light combined with itself and result in a combined value G2.

step 5. we work out the final green channel value G3 by using the mathematical model we described below.

step 6. we use a simple color mapping model to get the Whitening image.

step 7. skin color recognition is performed to the original image to obtain a corresponding skin color probability of each pixel.

step 8. by using a product of value G3 and the skin color probability we calculated by step 7 as a transparency, transparency blending is performed to the original image and the whitened image to obtain the final cosmetic image.

$$G1=(2*G-2*fg+1)/2,$$

wherein, G1 is combined green channel value after the linear light blending with the corresponding blurred image, The green channel value G of each pixel in the original image, and fg is the corresponding value of the blurred image.

the number of iterations was set experimentally 1 to 10 times in order to make a good performance.

Preferably, the hard light blending in step 4 is performed by the following formula: resultColor=((base)<= 128?(base)*(base)/128:255−(255−(base))*(255−(base))/ 128), wherein, resultColor is a result of the hard light calculation, and (base) is G1 obtained by the linear light blending in step 3.

Preferably, the calculation method in step 5 is shown as follows:

```
if (Red<0.5)
{
alphaValue=1.0−(0.5−Red)*2.0;
}
Else
{
alphaValue=1.0;
}
G3=G2*max(0.0, alphaValue−Blue*0.0019608);
``` wherein, G3 is the third green channel value, the initial value of G2 is a result of the hard light blending in step 4, Red is a value of a red channel after Gaussian blur, and Blue is a value of a blue channel after Gaussian blur.

Preferably, in step 6, the color mapping is performed to the original image to obtain a whitened image, wherein the color mapping is performed by the following formula:

$$oralColor=arrayCurve[oralColor],$$

wherein, arrayCurve is a group of predefined color mapping, and oralColor is a color value of a red channel, a green channel and a blue channel of a single pixel in the original image.

Preferably, the performing skin color recognition to the original image to obtain a corresponding skin color probability value in step 7 further includes the following steps of:

step 71: performing face recognition to the original image to obtain a face region;

step 72: performing average calculation to the face region to obtain an average skin color;

step 73: calculating a skin color probability mapping table of the current image according to the average skin color;

step 74: performing skin color recognition to the current image according to the skin color probability mapping table to obtain a skin color probability value of the current image.

Preferably, step 72 further includes:

step 721: initializing an original skin model;

step 722: calculating an average color value of the whole image as a threshold of the initial skin; and step 723: calculating the average skin color of the face region according to the obtained threshold of the initial skin.

Preferably, step 722 further includes:

step 7221: traversing pixel points of the whole image, and accumulating color values of the red channel, the green channel and the blue channel to obtain an accumulated color sum; and step 7222: dividing the accumulated color value by the total number of the pixel points to obtain average values of the red channel, the green channel and the blue channel, and using the average values as the threshold of the initial skin.

Preferably, step 723 further includes:

step 7231: calculating a grayscale value of the average skin color according to the following formula:

$$GRAY1=0.299*RED+0.587*GREEN+0.114*BLUE,$$

wherein, the GRAY1 is the gray value of the current pixel point of a gray image, and RED, GREEN and BLUE are color values of red, green and blue channels of the current pixel point of the image, respectively;

step 7232: using the grayscale value as a threshold for excluding a non-skin portion of the face region;

step 7233: sequentially traversing the color values of the pixel points within the face region, and obtaining the average skin color according to the following formula:

$$skin=SkinModel[red][blue],$$

wherein, skin is a skin value after the color mapping of a skin model, SkinModel is an initialized original skin model, red is the color value of the red channel, and blue is the color value of the blue channel.

Preferably, in step 73, a skin color probability mapping table of the current image is calculated according to the average skin color, where, the skin color probability mapping table is acquired by the following step:

step 731: establishing a skin color probability mapping table having 256*256 in size;

step 731: sequentially performing value assignment to the skin color probability mapping table in turn, the specific pseudo-codes shown as follows:

presetting temporary variables, i.e., i, j, SkinRed_Left, AlphaValue, Offset, TempAlphaValue and OffsetJ, all integers;

presetting a variable of the skin color probability mapping table SkinProbability[256][256];

where, Skin Red is the average value of the red channel obtained in step 7222, and SkinBlue is the average value of the blue channel obtained in step 7222;

presetting the value of the SkinRed_Left by the following formula:

```
kinRed_Left
= SkinRed - 128;
   For(i=0; i<256; i++)
   {;
``` calculating the value of Offset by the following formula Offset=max(0,min(255, i-SkinRed_Left));

judging whether the value of Offset is less than 128; if the value of Offset is less than 128, AlphaValue=Offset*2; and if the value of Offset is greater than or equal to 128, AlphaValue=255;

```
For(i=0; j<256; j++)
   {;
``` calculating the value of OffsetJ by the following formula OffsetJ=max(0, j-SkinBlue);

calculating the value of TempAlphaValue by the following formula TempAlphaValue=max(AlphaValue−(OffsetJ*2), 0);

judging the value of TempAlphaValue, where, the value of SkinProbability[i][j] is 255 if the value of TempAlphaValue is greater than 160;

the value of SkinProbability[i][j] is 0 if the value of TempAlphaValue is less than 90; or, the value of SkinProbability[i][j] is equal to TempAlphaValue plus 30;

```
  }
}.
```

Preferably, in step 74, skin color recognition is performed to the current image according to the skin color probability mapping table to obtain a skin color probability value of the current image, where, the calculation method is as follows:

$$skinColor=SkinProbability[red][blue],$$

where, skinColor is a skin color probability value of the current image, SkinProbability is the skin color probability table, red is the color value of the red channel of the pixel point, and blue is the color value of the blue channel of the pixel point.

Preferably, in step 71, face recognition is performed to the original image to obtain a face region, and the whole image is defined as the face region if the face region recognition is failed.

Preferably, in step 8, a product of multiplying the third green channel value G3 by the corresponding skin color probability value is used as a transparency, and transparency blending is performed to the original image and the whitened image to compose a beautified image, where, the formula is as follows:

$$resultColor=oralColor*alpha+(1.0-alpha)*arrayColor,$$

where, resultColor is a color value of the processed beautified image, oralColor is a color value of the original image, arrayColor is a color value of the whitened image obtained in step 6, and alpha is a product of multiplying a normalized value of G3 obtained in step 5 by the corresponding skin color probability value, where, the normalization is performed by the following formula: G3/255.0.

The present invention has the following beneficial effects.

The fast face beautifying method for digital images provided by the present invention may be widely applied in the field of image processing, in present image post-processing software on personal computers, mobile phones, tablet computers and other platforms, and in cameral real-time filters of some equipment with digital cameras. In general, the present invention may be applied in different image processing software fields according to the intention of a software designer. Moreover, skin recognition can find out black pixels which will be prevented from being processing by the beautification algorithm so that hairs, eyes and other non skin parts can be preserving. Consequently, the final effect of beautification will become better and more natural.

BRIEF DESCRIPTION OF THE DRAWINGS

The drawings described herein are used for providing further understanding of the present invention and constitute a part of the present invention. Exemplary embodiments of the present invention and descriptions thereof are used for explaining the present invention and are not intended to limit the preset invention. In the drawings.

DETAILED DESCRIPTION OF THE PREFERRED EMBODIMENTS

Figure 1:
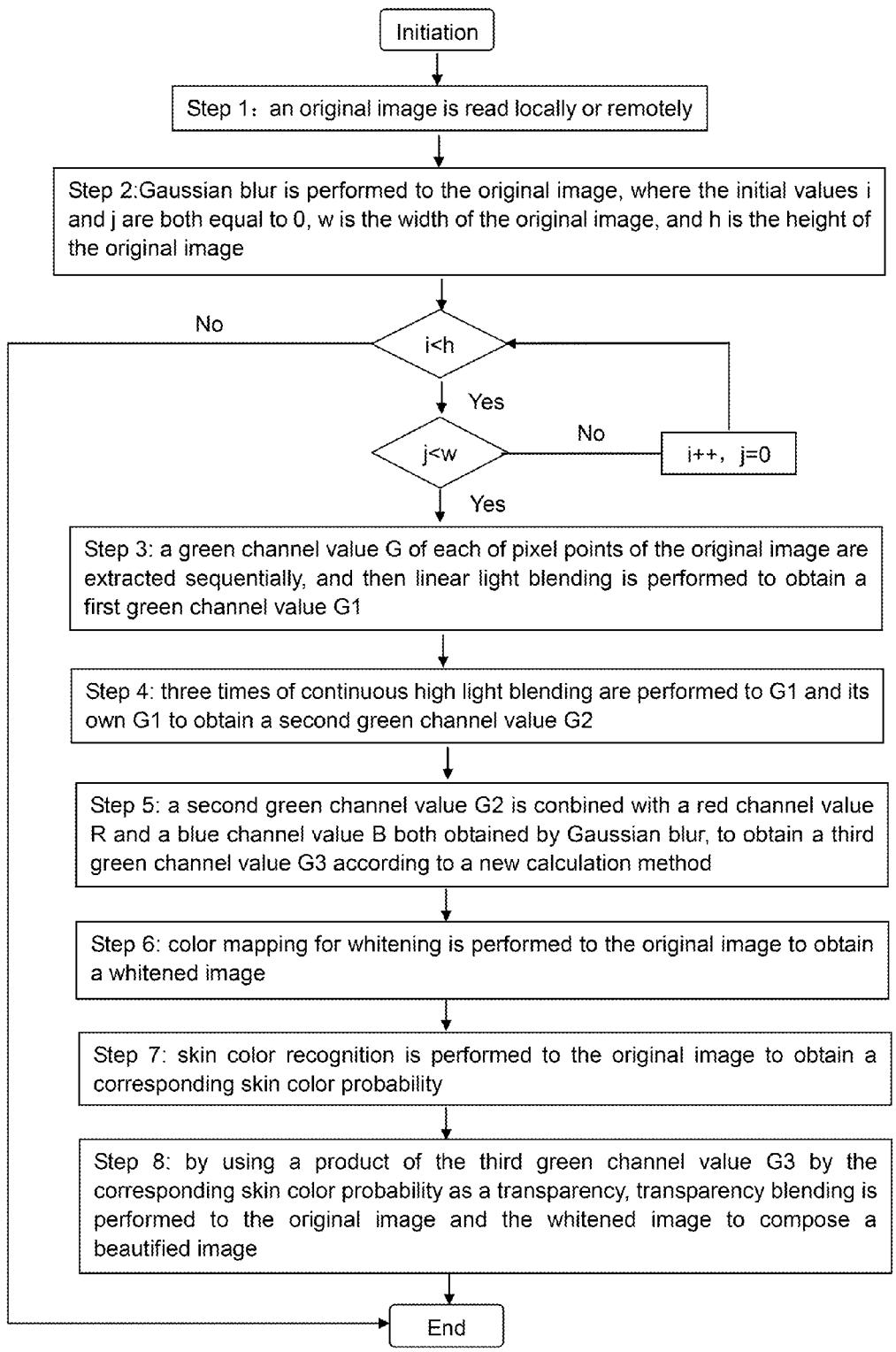
FIG. 1 is a specific flowchart of the fast face beautifying method for digital images according to the present invention.

In order to solve the technical problems, to state the advantages of the present invention clearer and more explicit, the present invention will be further described as below in details with reference to the accompanying drawings and embodiments. It should be understood that the specific embodiments described herein are merely used for explaining the present invention and are not intended to limit the present invention.

As shown in FIG. 1, the present invention provides a fast face beautifying method for digital images, including the following steps of:

step 1: reading an original image locally or remotely;

step 2. the original green channel image is convolved with Gaussians to produce the Blurred image. we set the count variable i and j to zero. the constant variable h refer to the image height and w refer to the image width.

step 3. The green channel value G of each pixel in the original image is linear combined to the green channel value in the blurred image got by step 2 and result in a combined value G1.

step 4. The combined green channel value G1 of each pixel in the combined image we got by step 3 is hard-light combined with itself and result in a combined value G2.

step 5. we work out the final green channel value G3 by using the mathematical model we described below.

step 6. we use a simple color mapping model to get the Whitening image.

step 7. skin color recognition is performed to the original image to obtain a corresponding skin color probability of each pixel.

step 8. by using a product of value G3 and the skin color probability we calculated by step 7 as a transparency, transparency blending is performed to the original image and the whitened image to obtain the final cosmetic image.

The Gaussian blur in step 2 is to calculate the transform of each pixel in the image by normal distribution, the normal distribution equation in an N-dimensional space is as follows:

$$G(r) = \frac{1}{\sqrt{2\pi\sigma^2}^N} e^{-r^2/(2\sigma^2)},$$

and the normal distribution equation in a two-dimensional space is as follows:

$$G(u, v) = \frac{1}{2\pi\sigma^2} e^{-(u^2+v^2)/(2\sigma^2)},$$

where, r is a blur radius $r^2 = u^2 + v^2$, σ is a standard deviation of a normal distribution, u is a position offset of an original pixel point on an x-axis, and v is a position offset of the original pixel point on a y-axis.

The formula of the linear light blending in step 3 is as follows:

$$G1 = (2*G - 2*fg + 1)/2,$$

where, G1 is a color value of a green channel of a single pixel after the linear light blending, G is a color value of a green channel of the original image of the single pixel, and fg is a color value of a green channel of a pixel in the image subjected to Gaussian blur in step 2 corresponding to a same position.

The main purpose of the hard light blending in step 4 is to widen a difference between colors of the image thus to achieve the beatification effect. The continuous hard light blending in step 4 is performed for 1 to 10 times. When the number of times of the continuous hard light blending is very few, the beatification effect will not be obvious. In this embodiment, the continuous hard light blending is performed for 3 times, which may better solve the technical problems and achieve better beatification effect. Those skilled in the art may select different times of blending according to different image beatification solutions. The formula of the hard light blending is as follows:

resultColor=((base)<=128?(base)*(base)/128:255−(255−(base))*(255−(base))/128), where, resultColor is a result of the hard light calculation, and (base) is G1 obtained by the linear light blending in step 3.

The calculation method in step 5 is as follows:

```
if (Red<0.5)
{
alphaValue=1.0−(0.5−Red)*2.0;
}
Else
{
alphaValue=1.0;
}
G3=G2*max(0.0, alphaValue−Blue*0.0019608);
``` where, G3 is the third green channel value, the initial value of G2 is a result of the hard light blending in step 4, Red is a value of a red channel after Gaussian blur, and Blue is a value of a blue channel after Gaussian blur.

In step 6, the color mapping is performed to the original image to obtain a whitened image, where, the color mapping is performed by the following formula:

oralColor=arrayCurve[oralColor], where, arrayCurve is a group of predefined color mapping, and oralColor is a color value of a red channel, a green channel and a blue channel of a single pixel in the original image.

In step 7, the performing skin color recognition to the original image to obtain a corresponding skin color probability value further includes the following steps of:

step 71: performing face recognition to the original image to obtain a face region, where, the whole image is defined as the face region if the face region recognition is failed;

step 72: performing average calculation to the face region to obtain an average skin color;

step 73: calculating a skin color probability mapping table of the current image according to the average skin color; and step 74: performing skin color recognition to the current image according to the skin color probability mapping table to obtain a skin color probability value of the current image.

The face recognition involved in step 71 will not be repeatedly described as it doesn't relate to the main content of the present invention. In this embodiment, conventional methods may be employed for face recognition In the paper, for example, "P. Viola and M. Jones. Rapid Object Detection using a Boosted Cascade of Simple Features, in: Computer Vision and Pattern Recognition, 2001.CVPR 2001. Proceedings of the 2001 IEEE Computer Society Conference on". An approximate regional position of a face is obtained by positioning.

Step 72 further includes:

step 721: initializing an original skin model;

step 722: calculating an average color value of the whole image as a threshold of the initial skin; and step 723: calculating the average skin color of the face region according to the obtained threshold of the initial skin.

In step 721, the step of initializing an original skin model is as follows:

step 7211: establishing a skin color model 256*256 in size;

step 7212: sequentially performing value assignment to the skin color model, the specific pseudo-codes shown as follows:

```
presetting temporary variables, i.e., AlphaValue, nMAx, i and j, all integers;
presetting a variable of the skin color model is SkinModel[256][256];
For(i=0;i<256;i++)
{
``` judging whether the value of the i is less than 128; if the value of the i is less than 128, AlphaValue is 255; and if the value of Offset is not less than 128, AlphaValue is equal to i*2;

calculating the value of nMax by the following formula nMax=min(256, AlphaValue*2);

```
For(j=0;j<nMax;j++)
{
``` calculating a value of a skin model at the corresponding position by the following formula SkinModel[i][j]=AlphaValue−(j/2);

```
}
For(j=nMax,j<256;j++)
{
initializing the value of a skin model at the corresponding position as 0;
}
}.
```

If expressed by severity codes, the formula of initializing the original skin model is as follows:

```
BYTE SkinModel[256][256];
BYTE AlphaValue = 255;
for( i = 0;i < 256;i++)
{
AlphaValue = (i < 128 ? (i<<1) : 255);
int nMax = min(256, (AlphaValue<<1));
for ( j=0; j<nMax; ++j)
{
SkinModel[i][j] = AlphaValue − (j>>1);
}
for ( j=nMax; j<256; ++j)
{
SkinModel[i][j] = 0;
}
}.
```

Step 722 further includes:

step 7221: traversing pixel points of the whole image, and accumulating color values of the red channel, the green channel and the blue channel to obtain an accumulated color sum;

step 7222: dividing the accumulated color value by the total number of the pixel points to obtain average values of the red channel, the green channel and the blue channel, and using the average values as the threshold of the initial skin.

Step 723 further includes:

step 7231: calculating a grayscale value of the average skin color according to the following formula:

GRAY1=0.299*RED+0.587*GREEN+0.114*BLUE, where, the GRAY1 is a gray value of the current pixel point of a gray image, and RED, GREEN and BLUE are color values of red, green and blue channels of the current pixel point of the image, respectively;

step 7232: using the grayscale value as a threshold for excluding a non-skin portion of the face region; and step 7233: sequentially traversing the color values of the pixel points within the face region, and obtaining the average skin color according to the following formula:

skin=SkinModel[red][blue], where, skin is a skin value after the color mapping of a skin model, SkinModel is an initialized original skin model, red is the color value of the red channel, and blue is the color value of the blue channel.

In step 73, a skin color probability mapping table of the current image is calculated according to the average skin color, where, the skin color probability mapping table is acquired by the following steps of:

step 731: establishing a skin color probability mapping table 256*256 in size;

step 731: sequentially performing value assignment to the skin color probability mapping table, the specific pseudo-codes shown as follows:

presetting temporary variables, i.e., i, j, SkinRed_Left, AlphaValue, Offset, TempAlphaValue and OffsetJ, all integers;

presetting a variable of the skin color probability mapping table SkinProbability[256][256];

where, SkinRed is the average value of the red channel obtained in step 7222, and SkinBlue is the average value of the blue channel obtained in step 7222;

presetting the value of the SkinRed_Left by the following formula:

```
kinRed_Left
= SkinRed − 128;
For(i=0; i<256; i++)
{;
``` calculating the value of Offset by the following formula Offset=max(0,min(255, i-SkinRed_Left));

judging whether the value of Offset is less than 128; if the value of Offset is less than 128, AlphaValue=Offset*2; and if the value of Offset is greater than or equal to 128, AlphaValue=255;

```
For(i=0; j<256; j++)
{;
``` calculating the value of OffsetJ by the following formula OffsetJ=max(0, j−SkinBlue);

calculating the value of TempAlphaValue by the following formula TempAlphaValue=max(AlphaValue−(OffsetJ*2), 0);

judging the value of TempAlphaValue, where, the value of SkinProbability[i][j] is 255 if the value of TempAlphaValue is greater than 160;

the value of SkinProbability[i][j] is 0 if the value of TempAlphaValue is less than 90; or, the value of SkinProbability[i][j] is equal to TempAlphaValue plus 30;

```
    }
}.
```

If expressed by severity codes, the skin color probability mapping table is specifically acquired by the following formula:

```
BYTE SkinModel[256][256];
BYTE AlphaValue = 255;
int SkinRed_Left = SkinRed − 128;
for(int i = 0;i < 256;i++)
{
int Offset = max(0,min(255,(i − SkinRed_Left)));
if(Offset < 128)
{
AlphaValue = (Offset<<1);
}
else
{
AlphaValue = 255;
}
for(int j = 0; j < 256; j++)
{
int OffsetJ = max(0, (j − SkinBlue));
int TempAlphaValue = max(AlphaValue − (OffsetJ >> 1), 0);
if (TempAlphaValue > 160)
{
SkinModel[i][j] = 255;
}
else if (TempAlphaValue < 90)
{
SkinModel[i][j] = 0;
}
else
{
SkinModel[i][j] = TempAlphaValue + 30;
}
}
},
``` where, SkinRed and SkinBlue are average values of the red channel and the blue channel obtained in step 7222.

In step 74, skin color recognition is performed to the current image according to the skin color probability mapping table to obtain a skin color probability value of the current image, where, the calculation method is as follows:

skinColor=SkinProbability[red][blue], where, skinColor is a skin color probability value of the current image, SkinProbability is the skin color probability table, red is the color value of the red channel of the pixel point, and blue is the color value of the blue channel of the pixel point.

In step 8, a product of multiplying the third green channel value G3 by the corresponding skin color probability value is used as a transparency, and transparency blending is performed to the original image and the whitened image to compose a beautified image, where, the formula is as follows:

resultColor=oralColor*alpha+(1.0−alpha)*arrayColor, where, resultColor is a color value of the processed beautified image, oralColor is a color value of the original image, arrayColor is a color value of the whitened image obtained in step 6, and alpha is a product of a normalized value of G3 obtained in step 5 by the corresponding skin color probability value, where, the normalization is performed by the following formula: G3/255.0.

The steps of the fast face beautifying method for digital images will be described as below in details with reference to FIG. 1, including:

step 1: an original image is read locally or remotely, the image including a single image or a single-frame image cut from a video or a single frame in a GIF animation;

step 2: Gaussian blur is performed to the original image, where, the initial values i and j are both equal to 0, w is the width of the original image, and h is the height of the original image; if i<h, it is judged whether j<w, or otherwise the procedure ends; j<w, the procedure proceeds to the next, or otherwise i=++ calculation is performed and whether i<h is judged again;

step 3: a green channel value G and fg of each of pixel points of the original image after Gaussian blur are extracted sequentially, and then linear light blending is performed to obtain a first green channel value G1, where, the use of green light is to save the time of brightness calculation and accelerate the computing speed;

step 4: three times of continuous hard light blending are performed to G1 obtained in step 3 and its own G1 to obtain a second green channel value G2, where, this step functions as widening a contrast, thereby making a bright portion brighter and a dark portion darker;

step 5: the second green channel value G2 is combined with a red channel value R and a blue channel value B both obtained by Gaussian blur, to obtain a third green channel value G3 according to a new calculation method;

step 6: color mapping for whitening is performed to the original image to obtain a whitened image;

step 7: skin color recognition is performed to the original image to obtain a corresponding skin color probability value; and step 8: by using a product of the third green channel value G3 by the corresponding skin color probability value as a transparency, transparency blending is performed to the original image and the whitened image to compose a beautified image.

Through the foregoing description of the embodiments, those technicians in the field of digital image processing can clearly understand the invention. They can implement this algorithm by software or in virtue of software and necessary general hardware platforms. On the basis of this understanding, the technical solutions of the present invention may be embodied in form of software products which may be stored in non-volatile memory media (may be CD-ROM, USB flash disks, mobile hard disks, etc.) and include a number of instructions for allowing computer equipment (may be a personal computer, a server, network equipment, etc.) to execute the method described in each of embodiments of the present invention.

The foregoing descriptions show and describe the preferred embodiments of the present invention. As described above, it should be understood that, the present invention is not limited to the forms disclosed herein and should not be regarded as excluding other embodiments, instead, may be applied to other combinations, modifications and environments; moreover, the present invention may be altered according to the above teachings or technology or knowledge in the relevant art, within the scope of the concept of the present invention. Furthermore, all alterations and changes made by those skilled in the art without departing from the spirit and scope of the present invention shall fall into the protection scope of the appended claims of the present invention.

What is claimed is:

1. A fast face beautifying method for digital images, comprising the following steps of:
   step 1: reading an original image locally or remotely;
   step 2: performing Gaussian blur to the original image to obtain a blurred image;
   step 3: sequentially extracting a green channel value G of a single pixel of the original image, and performing linear light blending to the green channel with a corresponding pixel of the blurred image to obtain a first green channel value G1;
   step 4: performing continuous hard light blending to the first green channel value G1 obtained by linear light blending with the its own G1 to obtain a second green channel value G2;
   step 5: combining the second green channel value G2 with a red channel value R and a blue channel value B both obtained by Gaussian blur, to obtain a third green channel value G3;
   step 6: performing color mapping to the original image to obtain a whitened image;
   step 7: performing skin color recognition to the original image to obtain a corresponding skin color probability value; and
   step 8: using a product of the third green channel value G3 by the corresponding skin color probability value as a transparency, performing transparency blending to the original image and the whitened image to compose a beautified image.

2. The fast face beautifying method for digital images according to claim 1, wherein the linear light blending in step 3 is performed by the following formula:

$G1=(2*G \times 21g+1)/2$, wherein, G1 is a color value of a green channel of a single pixel after the linear light blending, G is a color value of a green channel of the original image of the single pixel, and fg is a color value of a green channel of a pixel in the image subjected to Gaussian blur in step 2 corresponding to a same position.

3. The fast face beautifying method for digital images according to claim 1, wherein the continuous hard light blending in step 4 is performed for 1 to 10 times.

4. The fast face beautifying method for digital images according to claim 3, wherein the hard light blending in step 4 is performed by the following formula:

resultColor=((base)<=128?(base)*(base)/128:255−(255−(base))*(255−(base))/128), where, resultColor is a result of the hard light calculation, and (base) is G1 obtained by the linear light blending in step 3.

5. The fast face beautifying method for digital images according to claim 1, wherein the calculation method in step 5 is shown as follows:

```
   if (Red<0.5)
   {
   alphaValue=1.0−(0.5−Red)*2.0;
   }
   Else
   {
   alphaValue=1.0;
   }
   G3=G2*max(0.0, alphaValue−Blue*0.0019608);
   ``` wherein, G3 is the third green channel value, the initial value of G2 is a result of the hard light blending in step 4, Red is a value of a red channel after Gaussian blur, and Blue is a value of a blue channel after Gaussian blur.

6. The fast face beautifying method for digital images according to claim 1, wherein, in step 6, color mapping is performed to the original image to obtain a whitened image, the color mapping is performed by the following formula:

oralColor=arrayCurve[oralColor], wherein, arrayCurve is a group of predefined color mapping, and oralColor is a color value of a red channel, a green channel and a blue channel of a single pixel in the original image.

7. The fast face beautifying method for digital images according to claim 1, wherein, the performing skin color recognition to the original image to obtain a corresponding skin color probability in step 7 further comprises the following steps of:
   step 71: performing face recognition to the original image to obtain a face region;
   step 72: performing average calculation to the face region to obtain an average skin color;
   step 73: calculating a skin color probability mapping table of the current image according to the average skin color; and
   step 74: performing skin color recognition to the current image according to the skin color probability mapping table to obtain a skin color probability value of the current image.

8. The fast face beautifying method for digital images according to claim 7, wherein step 72 further comprises:
   step 721: initializing an original skin model;
   step 722: calculating an average color value of the whole image as a threshold of the initial skin; and
   step 723: calculating the average skin color of the face region according to the obtained threshold of the initial skin.

9. The fast face beautifying method for digital images according to claim 8, wherein step 722 further comprises:
   step 7221: traversing pixel points of the whole image, and accumulating color values of the red channel, the green channel and the blue channel to obtain an accumulated color sum; and
   step 7222, dividing the accumulated color value by the total number of the pixel points to obtain average values of the red channel, the green channel and the blue channel, and using the average values as the threshold of the initial skin.

10. The fast face beautifying method for digital images according to claim 8, wherein step 723 further comprises:
    step 7231: calculating a grayscale value of the average skin color according to the following formula:

GRAY1=0.299*RED+0.587*GREEN+0.114*BLUE, where, GRAY1 is a gray value of the current pixel point of a gray image, and RED, GREEN and BLUE are color values of red, green and blue channels of the current pixel point of the image, respectively;

step 7232: using the grayscale value as a threshold for excluding a non-skin portion of the face region;

step 7233: sequentially traversing the color values of the pixel points within the face region, and obtaining the average skin color according to the following formula:

skin=SkinModel[red][blue], wherein, skin is a skin value after the color mapping of a skin model, SkinModel is an initialized original skin model, red is the color value of the red channel, and blue is the color value of the blue channel.

11. The fast face beautifying method for digital images according to claim 7, wherein, in step 73, a skin color probability mapping table of the current image is calculated according to the average skin color, where, the skin color probability mapping table is acquired by the following steps of:

step 731: establishing a skin color probability mapping table 256*256 in size;

step 731: sequentially performing value assignment to the skin color probability mapping table, the specific pseudo-codes shown as follows:

presetting temporary variables, i.e., i, j, SkinRed_Left, AlphaValue, Offset, TempAlphaValue and OffsetJ, all integers;

presetting a variable of the skin color probability mapping table SkinProbability[256][256]

wherein, SkinRed is the average value of the red channel obtained in step 7222, and SkinBlue is the average value of the blue channel obtained in step 7222;

presetting the value of the SkinRed_Left by the following formula: kinRed_=SkinRed-128;

For(i=0; i<256; i++)
{;
calculating the value of Offset by the following formula Offset=max(0,min(255, i-SkinRed_Left));

judging whether the value of Offset is less than 128; if the value of Offset is less than 128, AlphaValue=Offset*2; and if the value of Offset is greater than or equal to 128, AlphaValue=255;

For(i=0; j<256; j++)
{;
calculating the value of OffsetJ by the following formula OffsetJ=max(0, j-SkinBlue);

calculating the value of TempAlphaValue by the following formula TempAlphaValue=max(AlphaValue-(OffsetJ*2), 0);

judging the value of TempAlphaValue, where, the value of SkinProbability[i][j] is 255 if the value of TempAlphaValue is greater than 160;

the value of SkinProbability[i][j] is 0 if the value of TempAlphaValue is less than 90;

or, the value of SkinProbability[i][j] is equal to TempAlphaValue plus 30;
}
}
}.

12. The fast face beautifying method for digital images according to claim 7, wherein, in step 74, skin color recognition is performed to the current image according to the skin color probability mapping table to obtain a skin color probability value of the current image, wherein, the calculation method is as follows:

skinColor=SkinProbability[red][blue], wherein, skinColor is a skin color probability value of the current image, SkinProbability is the skin color probability table, red is the color value of the red channel of the pixel point, and blue is the color value of the blue channel of the pixel point.

13. The fast face beautifying method for digital images according to claim 7, wherein, in step 71, face recognition is performed to the original image to obtain a face region, and the whole image is defined as the face region if the face region recognition is failed.

14. The fast face beautifying method for digital images according to claim 1, wherein, in step 8, the product of multiplying the third green channel value G3 by the corresponding skin color probability value is used as a transparency, and transparency blending is performed to the original image and the whitened image to compose a beautified image, wherein, the formula is as follows:

resultColor=oralColor*alpha+(1.0-alpha)*arrayColor, where, resultColor is a color value of the processed beautified image, oralColor is a color value of the original image, arrayColor is a color value of the whitened image obtained in step 6, and alpha is a product of a normalized value of G3 obtained in step 5 by the corresponding skin color probability value, where, the normalization is performed by the following formula: G3/255.0.

* * * * *